United States Patent
Ukrainetz et al.

(10) Patent No.: US 7,729,284 B2
(45) Date of Patent: Jun. 1, 2010

(54) DISCOVERY AND CONFIGURATION OF DEVICES ACROSS AN ETHERNET INTERFACE

(75) Inventors: Nathan H. W. Ukrainetz, Costa Mesa, CA (US); Carl Joseph Mies, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1008 days.

(21) Appl. No.: 11/039,336

(22) Filed: Jan. 19, 2005

(65) Prior Publication Data

US 2006/0159032 A1    Jul. 20, 2006

(51) Int. Cl.
  H04L 12/28   (2006.01)
  H04L 12/56   (2006.01)
  G06F 15/16   (2006.01)
  G06F 15/173  (2006.01)

(52) U.S. Cl. ............ 370/254; 370/390; 370/395.52; 370/432; 709/220; 709/223; 709/230

(58) Field of Classification Search .......... 370/254, 370/390, 395.52, 432; 709/220, 223, 230
See application file for complete search history.

(56) References Cited

U.S. PATENT DOCUMENTS

| | | | | |
|---|---|---|---|---|
| 5,854,901 A * | 12/1998 | Cole et al. | ............... | 709/245 |
| 5,982,753 A * | 11/1999 | Pendleton et al. | ........... | 370/252 |
| 6,115,545 A * | 9/2000 | Mellquist | ................ | 709/220 |
| 6,182,075 B1 * | 1/2001 | Hsu | ........................... | 707/10 |
| 6,470,013 B1 * | 10/2002 | Barach et al. | ............... | 370/392 |
| 6,556,541 B1 * | 4/2003 | Bare | ........................... | 370/235 |
| 6,795,403 B1 * | 9/2004 | Gundavelli | ................ | 370/256 |
| 6,826,611 B1 * | 11/2004 | Arndt | ........................ | 709/226 |
| 6,917,626 B1 * | 7/2005 | Duvvury | .................... | 370/466 |
| 6,947,384 B2 * | 9/2005 | Bare | ........................... | 370/235 |
| 6,971,044 B2 * | 11/2005 | Geng et al. | ................... | 714/11 |
| 7,010,622 B1 * | 3/2006 | Bauer et al. | ................. | 709/252 |
| 7,035,257 B2 * | 4/2006 | Vafaei | ....................... | 370/389 |
| 7,058,059 B1 * | 6/2006 | Henry et al. | ............. | 370/395.1 |
| 7,131,031 B2 * | 10/2006 | Brundridge et al. | ........... | 714/25 |
| 7,203,750 B1 * | 4/2007 | Kracht | ...................... | 709/224 |
| 7,203,954 B1 * | 4/2007 | Tsang et al. | ................. | 725/111 |
| 7,302,256 B1 * | 11/2007 | O'Hara et al. | ............... | 455/418 |
| 7,313,610 B2 * | 12/2007 | Held et al. | .................... | 709/222 |
| 7,383,574 B2 * | 6/2008 | Burrows et al. | ............... | 726/13 |
| 2004/0105444 A1 * | 6/2004 | Korotin et al. | ........... | 370/395.5 |
| 2005/0044196 A1 * | 2/2005 | Pullen et al. | ................ | 709/223 |
| 2005/0076145 A1 * | 4/2005 | Ben-Zvi et al. | ............. | 709/245 |
| 2006/0034318 A1 * | 2/2006 | Fernandes et al. | ........... | 370/463 |
| 2006/0155836 A1 * | 7/2006 | Chang et al. | ................ | 709/223 |

* cited by examiner

*Primary Examiner*—Alpus H Hsu
(74) *Attorney, Agent, or Firm*—Morrison & Foerster LLP

(57) ABSTRACT

The discovery and configuration of devices of interest connected to the Ethernet by an Ethernet port is disclosed. To perform discovery, Client software in a management interface transmits packets including the address of the management interface and a port identifier to a known broadcast address, requesting the MAC address for all devices of interest. Server software in the devices of interest parse the broadcast packets and broadcast a packet containing a MAC address that uniquely identifies the devices of interest back to the Client. Once the MAC addresses are returned to the Client, the Client can then broadcast protocol packets requesting the configuration of a specific device of interest such as a new IP address. Once a device of interest is configured with at least an IP address, the device of interest can communicate using TCP/IP, and it can thereafter be managed using higher level tools and firmware.

26 Claims, 3 Drawing Sheets

DISCOVERY AND CONFIGURATION OF DEVICES ACROSS AN ETHERNET INTERFACE

BACKGROUND OF THE INVENTION

1. Field of the Invention

The present invention relates, generally, to the discovery and configuration of devices connected to a network; and in particular embodiments, to the discovery and configuration of storage devices connected to an Ethernet network without using the Internet Protocol (IP) address of the devices.

2. Description of Related Art

FIG. 1 illustrates a Fibre Channel (FC) storage system 100 utilizing root switches 102. FC storage system 100 also includes Redundant Array of Independent Disks (RAID) controllers 104 and multiple "don't care" Bunch Of Disks (xBODs) 106, which may be either a Switched Bunch Of Disks (SBODs) or Just a Bunch Of Disks (JBODs). Each RAID controller 104 is connected to a root switch 102, which may be a "half-rack" device, and each root switch 102 is connected to each xBOD 106 via dedicated ports. Dual channels may be provided for each connection (e.g. channel A and B) for redundancy. The RAID controllers 104 and root switches 102 may include Ethernet ports 108 to provide a management interface independent of the Fibre Channel interface. A personal computer (PC) 110 connected to an Ethernet network 114 can be used as a user interface to communicate with and manage the RAID controllers 104 and root switches 102 via an Ethernet switch or router 112 connected to the management interfaces (Ethernet ports 108) of the RAID controllers 104 and root switches 102.

FIG. 2 illustrates a local Ethernet network 200 (a subnet) for connecting and enabling communications with multiple devices of interest 202 and other Ethernet devices 204. The multiple devices of interest 202 and other Ethernet devices 204 connect to the local Ethernet network 200 via their Ethernet ports as described above. The devices of interest 202 are distinguished from other Ethernet devices 204 in that the devices of interest 202 may have the same manufacturer and may even perform the same function (e.g. root switches from the same manufacturer as shown in FIG. 1). Also attached to the Ethernet network 200 is a PC or other device 206 to configure and manage the devices of interest 202 and other Ethernet devices 204 (e.g. retrieve status, change configuration, and the like), and a router 208 for connecting the local Ethernet network 200 to other networks 210.

In legacy systems, in addition to the Ethernet ports described above, the devices of interest and other Ethernet devices include RS-232 serial ports. With an RS-232 serial port, a network manager could connect a PC directly to individual devices of interest and other Ethernet devices via their RS-232 serial ports, and provide or obtain the IP address (a unique software address for a device within a local network), Netmask, Gateway and other Ethernet-related information needed for communication over the Ethernet backbone. Note that a Gateway is an IP address for a router, which is the address that is needed when sending a request to a device in a different subnet or local area. When the router receives such a request, it forwards the request to the proper device in the other subnet or local area.

However, state of the art devices of interest may be physically small devices, such as the half-rack root switches of FIG. 1, and there may not be enough room to fit both an Ethernet port and an RS-232 serial port on each device of interest. In addition, while Ethernet ports are commonly used as management interfaces, RS-232 serial ports may be used very infrequently, such as only during initial configuration to set the IP address, net mask, and gateway for a device of interest, and may thereafter be unused.

Therefore, it would be desirable if the RS-232 serial port could be eliminated from a device of interest. However, when a device of interest arrives from a manufacturer, it needs to be configured. Without an RS-232 port and with only an Ethernet port, a network manager cannot currently set the IP address of the device of interest, and without the IP address, Transmission Control Protocol (TCP)/IP communications with the device of interest are impossible. Furthermore, the IP address of a device is usually dynamic. Any device could be potentially set with any IP address, and there may be no outward indication of a device's current IP address. Even if the IP address of a device is known, it may have been put into a network configuration for which it is not set up (i.e. the device's IP address, Gateway and Netmask are not set up correctly for the subnet it is placed on). Under this situation, the device will not be able to send IP traffic even if the IP address of the device is known.

Note that the only other way to obtain the IP address of a device is to use a Domain Host Control Protocol (DHCP) server implementing a DHCP protocol (or a similar protocol such as BOOTP or Reverse Address Resolution Protocol (RARP)), which requires a larger and more expensive implementation than the embodiments of the present invention described below. The DHCP server's primary function is to service requests for IP addresses. When a DHCP client running in a DHCP-enabled device first powers up, it sends a request to the DHCP server for an IP address and other information, to allow communication on an ethernet network. However, the DHCP server does not know which devices are "devices of interest," as defined above, and cannot perform configuration management on those devices of interest. In response to the request for an IP address, the DHCP server provides an address to the device of interest from a pool of IP addresses, but there is no way for a network manager to know which of the IP addresses from the pool was assigned to the device of interest, so management of the device of interest is still not possible. With this system, each device is individually tested to determine if it is a device of interest. Thus, use of a DHCP protocol and server to provide an IP address is not an acceptable solution.

If a device of interest with only an Ethernet port is received from the manufacturer and needs to be configured and managed, it may be connected to the Ethernet via its Ethernet port and communicate using Ethernet protocols. This is true because each device of interest has a known Media Access Control (MAC) address, which is a worldwide unique Ethernet name for that device of interest hardcoded at the factory. (This is in contrast to the IP address, which is software assigned and configured by users.) Note that regardless of what higher level protocol a device of interest uses to communicate, at the lowest level the bits put out onto the wire are Ethernet frames, which always have an Ethernet MAC source and destination address. However, although Ethernet communications are enabled, there is no way to communicate specifically with the device of interest using TCP/IP because its IP address is not known.

Therefore, there is a need to be able to configure and manage a device of interest (e.g. a root switch) and determine the IP address of that device of interest to enable TCP/IP communications with that device using only the Ethernet MAC address and an Ethernet port as a management interface.

SUMMARY OF THE INVENTION

Embodiments of the present invention are directed to the discovery and configuration of devices of interest connected to the Ethernet by an Ethernet port. Two separate software modules that communicate across TCP/IP are required, the Server and the Client. The Server is a software module that runs on the devices of interest. The Client is a software module that runs on the management interface. The devices of interest and the management interface are programmed or otherwise configured to implement a proprietary protocol. Using only the Ethernet MAC addresses of the devices of interest, a user operating a management interface is able to determine or change the IP address of the devices of interest to enable TCP/IP communications with those devices of interest. The management interface can be used to display all MAC-IP information for all devices of interest on the current subnet, and configure the devices of interest, regardless of whether the IP information is currently correct for the subnet. Runtime access to information about the devices of interest is provided across the Ethernet/IP interface. Although the device of interest may not have a proper unicast address, it is still possible to view configuration information and properly configure the device, as well as correlate all devices of interest with their current IP addresses.

Discovery is the identification of devices of interest, and the determination of the worldwide unique Ethernet MAC address for those devices of interest, over the Ethernet. To perform discovery, the PC or other management interface is programmed with a Client software module that transmits protocol packets having a proprietary protocol and a particular port identifier out of any available User Datagram Protocol (UDP) port over the Ethernet to a known vendor specific reserved broadcast IP address using broadcast frames at the IP and Ethernet level. In addition, the IP address of the management interface is also transmitted in the protocol packets. The protocol packets also contain a request for current IP configuration information from all devices of interest on the subnet.

Only those devices of interest running the Server software module according to embodiments of the present invention will be able to parse the proprietary data in the broadcast protocol packets according to the proprietary protocol and interpret the data. The Server then responds with a protocol packet containing current IP configuration information and an Ethernet MAC address that uniquely identifies the device of interest. Because the device of interest may not have a proper IP address, Netmask and Gateway for the subnet to send unicast information, the Server will send replies, via IP broadcast, back to the Client's UDP port. This ensures communication with the devices of interest regardless of their proper IP configuration.

Configuration is the step of setting up each device of interest with parameters such as a new IP address. Once unique identifiers are returned to the Client (Ethernet MAC addresses), the Client has visibility to all devices of interest on the subnet, and the Client can then send protocol packets, requesting configuration of a specific device of interest. The protocol packets are transmitted according to the proprietary protocol and include new configuration data such as a new IP address. The protocol packets are still sent via an IP broadcast, but the protocol packet will contain the desired device identifier (MAC address) of the device of interest. Every device of interest will receive this packet, but once parsing the protocol information is completed, only one device of interest will see that the packet is for them (the device of interest with the matching MAC address). Once a device of interest is configured with an IP address, Netmask and Gateway, the device of interest can communicate using TCP/IP, and it can thereafter be managed using higher level tools and firmware.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are-directed to the discovery and configuration of devices of interest connected to the Ethernet by an Ethernet port. Two separate software modules that communicate across TCP/IP are required, the Server and the Client. The Server is a software module that runs on the devices of interest, and may be loadable onto the devices of interest from one or more storage media. The Client is a software module that runs on the management interface, and may be loadable onto the management interface from one or more storage media. The devices of interest and the management interface are programmed or otherwise configured by the Server and Client software to implement a proprietary protocol. Using only the Ethernet MAC addresses of the devices of interest, a user operating a management interface is able to determine and/or change the IP address of the devices of interest to enable TCP/IP communications with those devices of interest. The management interface can be used to display all MAC-IP information for all devices of interest on the current subnet, and configure the devices of interest, regardless of whether the IP information is currently correct for the subnet. Runtime access to information about the devices of interest is provided across the Ethernet/IP interface. Although the device of interest may not have a proper unicast address, it is still possible to view configuration information and properly configure the device, while correlating devices of interest to IP addresses.

Figure 1:
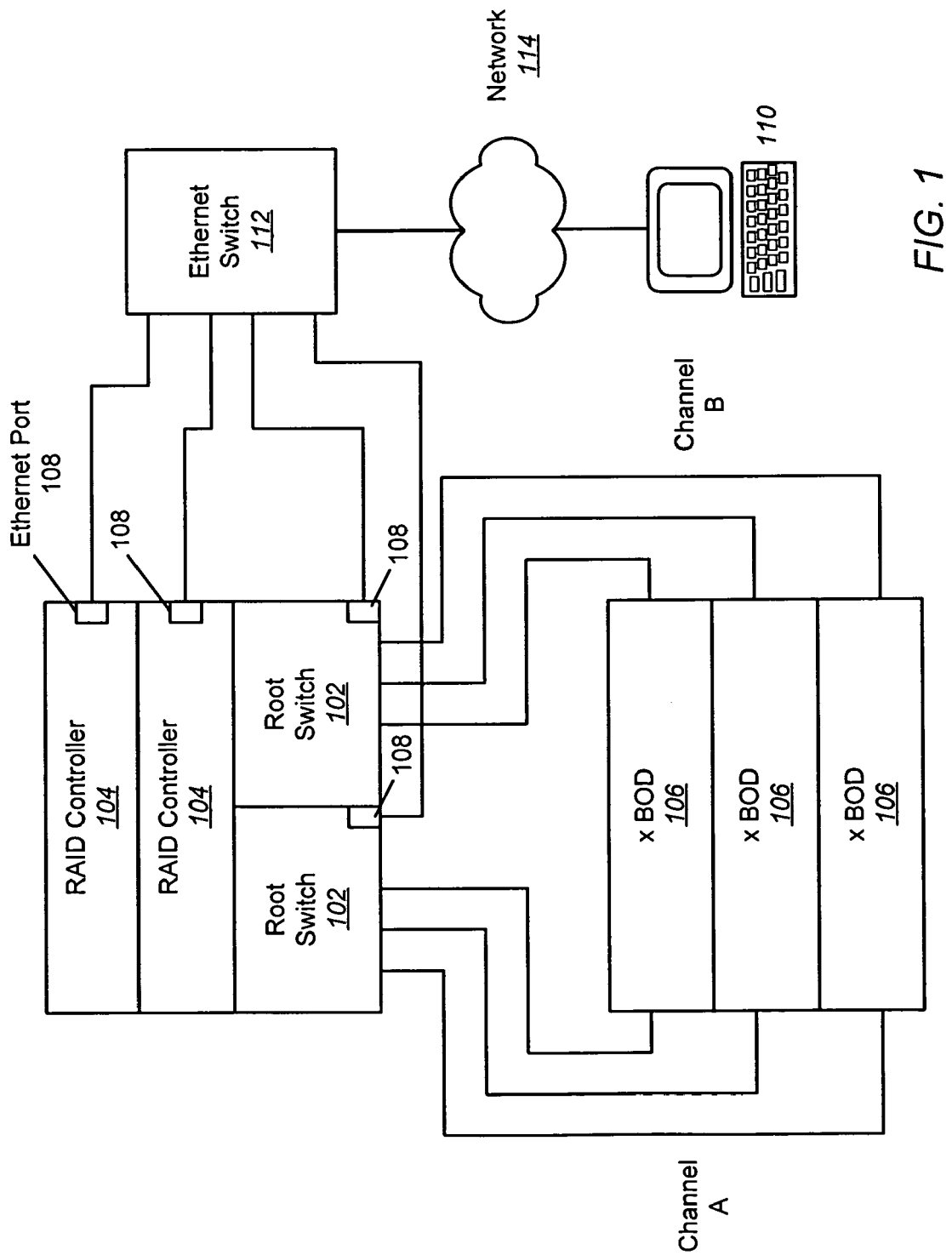
FIG. 1 illustrates a FC storage system utilizing root switches.
Figure 2:
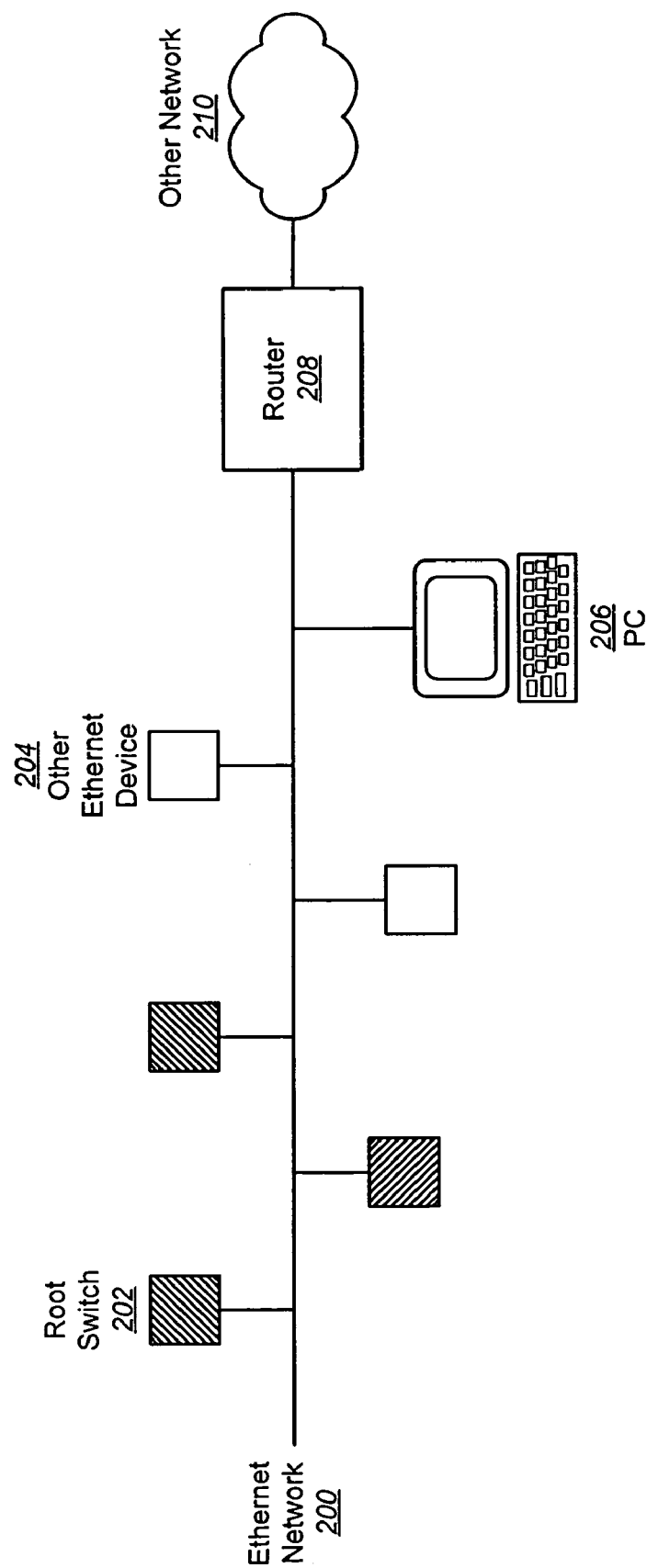
FIG. 2 illustrates a local Ethernet network (a subnet) for connecting and enabling communications with multiple devices of interest and other Ethernet devices.
Figure 3:
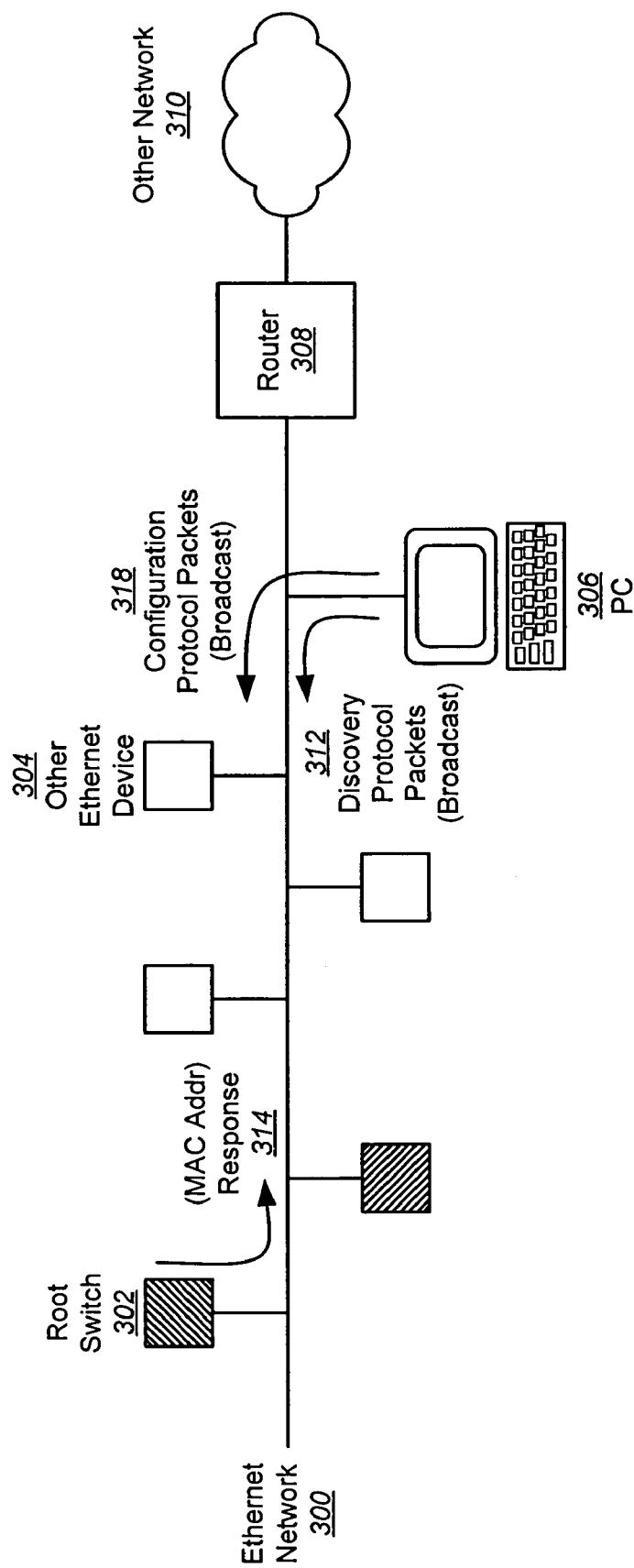
FIG. 3 illustrates a local Ethernet network (a subnet) for connecting and enabling communications with multiple devices of interest and other Ethernet devices according to embodiments of the present invention.

FIG. 3 illustrates a local Ethernet network 300 (a subnet) for connecting and enabling communications with multiple devices of interest 302 and other Ethernet devices 304 according to embodiments of the present invention. The multiple devices of interest 302 and other Ethernet devices 304 connect to the local Ethernet network 300 via their Ethernet ports as described above. The devices of interest 302 are distinguished from other Ethernet devices 304 in that the devices of interest 302 may have the same manufacturer and perform the same function, and in particular are programmed or otherwise configured according to embodiments of the present invention. Also attached to the Ethernet network 300 is a PC or other device 306 that is programmed or otherwise configured according to embodiments of the present invention for configuring and managing the devices of interest 302 (e.g. retrieve status, change configuration, and the like). Furthermore, also attached to the Ethernet network 300 is a router 308 for connecting the local Ethernet network 300 to other networks 310.

Discovery is the identification of devices of interest, and the determination of the worldwide unique Ethernet MAC address for those devices of interest, over the Ethernet. To perform discovery according to embodiments of the present invention, the PC or other management interface 306 is programmed with a Client software module that transmits discovery protocol packets 312 having a proprietary protocol and a particular port identifier out of any available UDP port over the Ethernet 300 to a known reserved broadcast IP address using broadcast frames at the IP and Ethernet level. In addition, the IP address of the management interface is also transmitted in the discovery protocol packets. The protocol packets also contain a request for current IP configuration information from all devices of interest on the subnet. It should be understood that although UDP relies on IP addresses, because the discovery protocol packets are transmitted as broadcast Ethernet frames with a broadcast Ethernet MAC address, all devices (302, 304) on the Ethernet 300 receive the discovery protocol packets.

In general, any PC or management interface 306 can be connected to the Ethernet 300 and be used to remotely discover all devices of interest 302 on the Ethernet 300 without having to physically connect up to the devices of interest 302. This can be of particular value when devices of interest 302 previously configured with an IP address are periodically connected into the subnet 300.

Only those devices of interest 302 running the Server software module according to embodiments of the present invention will be able to parse the proprietary data in the broadcast discovery protocol packets according to the proprietary protocol and interpret the data. The Server in all devices of interest listens on the UDP port, accepts all information destined for this port (i.e. the protocol packet 312) and parses the data according to the proprietary protocol. The Server then responds with a protocol packet containing current IP configuration information and an Ethernet MAC address that uniquely identifies the device of interest. Because the device of interest may not have a proper IP address, Netmask and Gateway for the subnet to send unicast information, the Server will send replies, via IP broadcast, back to the Client's UDP port. This ensures communication with the devices of interest regardless of their proper IP configuration.

For example, the Server running in all devices of interest 302 may detect a request in the first 12 bytes of data of a discovery protocol packet 312, and thereafter understand that a management interface 306 has sent that device of interest a request. The devices of interest 302 will then format and send back a specific response 314 to the management interface. This response includes the Ethernet MAC address and may include the IP address, Gateway, Netmask and any other parameters and information defined by embodiments of the present invention for the particular device of interest 302. With this information, the management interface 306 can identify all devices of interest 302 on the Ethernet 300, and may also be able to identify the function of each device of interest 302 (e.g. a root switch) and even the version of software or firmware operating in each device of interest 302. By knowing the function of each device of interest 302, the devices of interest 302 can be managed according to their function.

Other information can also be provided in the response to the discovery protocol packets 312 from the Client over the UDP connection. For example, FC assigns a unique address to FC-compatible entities. When initializing FC drives connected to a root switch, one of the drives is identified as a Loop Initialization Master (LIM) using this unique address. By providing this unique address to the management interface during discovery, the drive acting as the LIM can be identified, and a configuration map can be developed that shows which root switch is connected to which drive. A configuration map is important in large systems where root switches are performing different functions (e.g. primary storage root switches, front end user root switches, tape backup root switches), and need to be configured differently. By knowing the worldwide name of the LIM for each of those root switches and by knowing from the rest of the system topology who the RAID controller is, then it can be mapped out that a particular root switch is connected to the RAID controller and is used for primary storage. Similarly, if the worldwide name of the tape controller is known, then it can be mapped out that a particular root switch is used for tape backup. This FC unique address can also be used to locate failing devices.

Configuration is the step of setting up each device of interest 302 with parameters such as a new IP address. Once unique identifiers are returned to the Client (Ethernet MAC addresses), the Client has visibility to all devices of interest on the subnet, and the Client can then send configuration protocol packets 318, requesting configuration of a specific device of interest. The configuration protocol packets 318 are transmitted according to the proprietary protocol and include new configuration data such as a new IP address. The configuration protocol packets 318 are still sent via an IP broadcast, but the configuration protocol packet will contain the desired device identifier (MAC address) of the device of interest 302. Every device of interest will receive this packet, but once parsing the protocol information is completed, only one device of interest will see that the packet is addressed to them (the device of interest with the matching MAC address). If requested to change their IP configurations, the devices of interest can do so immediately without affecting the proprietary protocol communications. In this way, the Client can uniquely configure IP information on all devices of interest on the subnet. Once a device of interest is configured with at least an IP address, Netmask and Gateway, the device of interest can communicate using TCP/IP, and it can thereafter be managed using higher level tools and firmware.

In alternative embodiments of the present invention, the device of interest 302 may also be instructed by the configuration protocol packets to blink lights to physically identify it to an end user. In another alternative embodiment, if a device of interest 302 is malfunctioning or communications at the TCP/IP level are failing, the management interface 306 may be used to instruct the device of interest 302 to reset itself using protocol packets and the Ethernet MAC address rather than using TCP/IP.

An exemplary protocol that may be followed on the Client and Server side of the IP configuration implementation will now be described. The protocol is based on ASCII text based messages passed between server and client. The protocol is based on commands and replies in tag-data format. The general syntax is <SOME_TAG>[optional data]. Note that multiple tags can be contained in the same message, where each successive tag is appended at the end of the preceding one.

However, all tags must fit into one message sent out of Client or Server (there are no multi-UDP message tag commands).

The Client software in the management interface initiates all communication with the Server software in the devices of interest. Every Client command to a particular device of interest starts with the Ethernet MAC address of the intended recipient. This address may be the broadcast address. The format of the MAC address should be the exact ASCII text of the MAC address of the devices of interest: <DEST>[MAC_ADDRESS]. The address is then followed by a command to the destination device(s) of interest. The command can be any of the following:

| Client command | Purpose |
| --- | --- |
| <GET_ALL> | Instructs the destination to send ALL IP information back to client (IP address, Netmask and Gateway) |
| <SET_IP>[IP ADDRESS IN DOTTED DECIMAL NOTATION] | Instructs the destination to set its' current IP address |
| <SET_NETMASK>[NETMASK IN DOTTED DECIMAL NOTATION] | Instructs the destination to set its' current Netmask |
| <SET_GATEWAY>[GATEWAY IN DOTTED DECIMAL NOTATION] | Instructs the destination to set its' current Gateway |

The Client software listens for all responses from all devices of interest and only accepts messages that follow the correct reply format given below in the Server side replies.

The Server software executes all messages from the Client that conform to the above Server commands, where the destination MAC address in the Client message matches the address of the device of interest in which the Server software resides, or the destination MAC address is the broadcast address. The Server will only send a reply in response to a Client-initiated command. Every Server reply starts with the MAC address of the sender: <SRC>[MAC_ADDRESS]. The address is then followed by a reply for the Client. Server replies can be any of the following:

| Server command | Purpose |
| --- | --- |
| <IP>[IP ADDRESS IN DOTTED DECIMAL NOTATION] | Server response to a <GET_ALL> or a <SET_IP> from the client |
| <NETMASK>[NETMASK IN DOTTED DECIMAL NOTATION] | Server response to a <GET_ALL> or a <SET_NETMASK> from the client |
| <GATEWAY>[GATEWAY IN DOTTED DECIMAL NOTATION] | Server response to a <GET_ALL> or a <SET_GATEWAY> from the client |

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for discovering devices of interest connected to an Ethernet via Ethernet ports, the Ethernet comprising multiple other devices in addition to the devices of interest, comprising:

broadcasting discovery protocol packets from a management interface to the devices of interest over the Ethernet via the Ethernet ports, the discovery protocol packets including an IP address of the management interface and a request for configuration information from the devices of interest;

receiving and parsing the discovery protocol packets at the devices of interest; and sending, via IP broadcast, the configuration information from the devices of interest back to the management interface via the Ethernet ports, wherein, distinct from the other devices connected to the Ethernet, the devices of interest do not contain RS-232 serial ports, and only the devices of interest are configured with modules capable of parsing appropriate data in the discovery protocol packets.

2. The method as recited in claim 1, the request for configuration information broadcast from the management interface comprising a request for a MAC address from each of the devices of interest, and the configuration information sent from the devices of interest comprising respective MAC addresses of the devices of interest.

3. The method as recited in claim 2, further comprising configuring a particular device of interest by:

broadcasting configuration protocol packets from the management interface to the devices of interest over the Ethernet via the Ethernet ports, the configuration protocol packets including the MAC address and new configuration information for the particular device of interest;

receiving and parsing the configuration protocol packets at the devices of interest;

based on the MAC address, determining at the particular device of interest that the configuration protocol packets are intended for the particular device of interest; and configuring the particular device of interest with the new configuration information.

4. The method as recited in claim 3, the new configuration information comprising a new IP address.

5. The method as recited in claim 1, further comprising developing a configuration map from the configuration information received from the devices of interest.

6. The method as recited in claim 1, further comprising utilizing a tag-data format proprietary protocol for the communication of packets between the management interface and the devices of interest.

7. The method as recited in claim 6, further comprising utilizing a MAC address-command format for the tag-data format proprietary protocol for packets communicated from the management interface to the devices of interest, wherein the command is selected from the group consisting of a <GET_ALL> command, a <SET_IP>[IP ADDRESS IN DOTTED DECIMAL NOTATION] command, a <SET_NETMASK>[NETMASK IN DOTTED DECIMAL NOTATION] command, and a <SET_GATEWAY>[GATEWAY IN DOTTED DECIMAL NOTATION] command.

8. The method as recited in claim 6, further comprising utilizing a MAC address-command format for the tag-data format proprietary protocol for packets communicated from the devices of interest to the management interface, wherein the command is selected from the group consisting of a <IP>[IP ADDRESS IN DOTTED DECIMAL NOTATION] command, a <NETMASK>[NETMASK IN DOTTED DECIMAL NOTATION] command, and a <GATEWAY>[GATEWAY IN DOTTED DECIMAL NOTATION] command.

9. One or more storage media including a computer program which, when executed by one or more processors, causes the one or more processors to perform the steps of:

discovering devices of interest connected to an Ethernet via Ethernet ports by broadcasting discovery protocol packets from a management interface to the devices of interest over the Ethernet via the Ethernet ports, the discovery protocol packets including an IP address of the management interface and a request for a MAC address from each of the devices of interest;

receiving responses from the devices of interest, wherein the responses include a particular response from a particular device of interest, the particular response including a MAC address of the particular device of interest; and once the MAC address of the particular device of interest is known, configuring the particular device of interest by broadcasting configuration protocol packets from the management interface to the devices of interest over the Ethernet via the Ethernet ports, the configuration protocol packets including the MAC address and new configuration information for the particular device of interest, wherein, distinct from other devices connected to the Ethernet, the devices of interest do not contain RS-232 serial ports, and only the devices of interest are configured with modules capable of parsing appropriate data in the discovery protocol packets.

10. The one or more storage media as recited in claim 9 which, when executed by one or more processors, causes the one or more processors to perform the further step of utilizing a MAC address-command format for packets communicated from the management interface to the devices of interest, wherein the command is selected from the group consisting of a <GET_ALL> command, a <SET_IP>[IP ADDRESS IN DOTTED DECIMAL NOTATION] command, a <SET_NETMASK>[NETMASK IN DOTTED DECIMAL NOTATION] command, and a <SET_GATEWAY>[GATEWAY IN DOTTED DECIMAL NOTATION] command.

11. One or more storage media including a computer program which, when executed by one or more processors, causes the one or more processors to perform the steps of:

assisting in a discovery of devices of interest connected to an Ethernet via Ethernet ports by receiving and parsing discovery protocol packets at the devices of interest, the discovery protocol packets broadcast from a management interface to the devices of interest over the Ethernet via the Ethernet ports and including an IP address of the management interface and a request for a MAC address from each of the devices of interest, and sending respective MAC addresses from the devices of interest back to the management interface via the Ethernet ports; and configuring a particular device of interest by receiving and parsing configuration protocol packets at the devices of interest, the configuration protocol packets broadcast from the management interface to the devices of interest over the Ethernet via the Ethernet ports and including the MAC address and a new IP address for the particular device of interest, determining at the particular device of interest that the configuration protocol packets are intended for the particular device of interest based on the MAC address, and configuring the particular device of interest with the new IP address, wherein, distinct from the other devices connected to the Ethernet, the devices of interest do not contain RS-232 serial ports, and only the devices of interest are configured with modules capable of parsing appropriate data in the discovery protocol packets.

12. The one or more storage media as recited in claim 11 which, when executed by one or more processors, causes the one or more processors to perform the further step of utilizing a MAC address-command format for packets communicated from the devices of interest to the management interface, wherein the command is selected from the group consisting of a <IP>[IP ADDRESS IN DOTTED DECIMAL NOTATION] command, a <NETMASK>[NETMASK IN DOTTED DECIMAL NOTATION] command, and a <GATEWAY>[GATEWAY IN DOTTED DECIMAL NOTATION] command.

13. In a management interface, one or more processors programmed for:

discovering devices of interest connected to an Ethernet via Ethernet ports by broadcasting discovery protocol packets from a management interface to the devices of interest over the Ethernet via the Ethernet ports, the discovery protocol packets including an IP address of the management interface and a request for a MAC address from each of the devices of interest, and receiving a response from a particular device of interest, the response including a MAC address of the particular device of interest; and once the MAC address of the particular device of interest is known, configuring the particular device of interest by broadcasting configuration protocol packets from the management interface to the devices of interest over the Ethernet via the Ethernet ports, the configuration protocol packets including the MAC address and new configuration information for the particular device of interest, determining the configuration protocol packets are intended for the particular device of interest based on the MAC address, and configuring the particular device of interest with the new configuration information, wherein, distinct from other devices connected to the Ethernet, the devices of interest do not contain RS-232 serial ports, and only the devices of interest are configured with modules capable of parsing appropriate data in the discovery protocol packets.

14. The management interface as recited in claim 13, the one or more processors further programmed for utilizing a MAC address-command format for packets communicated from the management interface to the devices of interest, wherein the command is selected from the group consisting of a <GET_ALL> command, a <SET_IP>[IP ADDRESS IN DOTTED DECIMAL NOTATION] command, a <SET_NETMASK>[NETMASK IN DOTTED DECIMAL NOTATION] command, and a <SET_GATEWAY>[GATEWAY IN DOTTED DECIMAL NOTATION] command.

15. In a particular device of interest, one or more processors programmed for:

assisting in a discovery of devices of interest connected to an Ethernet via Ethernet ports by receiving and parsing discovery protocol packets at the particular device of interest, the discovery protocol packets broadcast from a management interface to devices of interest including the particular device of interest over the Ethernet via the Ethernet ports and including an IP address of the management interface and a request for a MAC address from each of the devices of interest, and sending the MAC address from the particular device of interest back to the management interface via the Ethernet ports; and configuring the particular device of interest by receiving and parsing configuration protocol packets at the particular device of interest, the configuration protocol packets broadcast from the management interface to the devices of interest over the Ethernet via the Ethernet ports and including the MAC address and a new IP address for a device of interest, determining at the particular device of interest that the configuration protocol packets are intended for the particular device of interest based on the MAC address, and configuring the particular device of interest with the new IP address, wherein, distinct from other devices connected to the Ethernet, the devices of interest do not contain RS-232 serial ports, and only the devices of interest are configured with modules capable of parsing appropriate data in the discovery protocol packets.

16. The particular device of interest as recited in claim 15, the one or more processors further programmed for utilizing a MAC address-command format for packets communicated from the devices of interest to the management interface, wherein the command is selected from the group consisting of a <IP>[IP ADDRESS IN DOTTED DECIMAL NOTATION] command, a <NETMASK>[NETMASK IN DOTTED DECIMAL NOTATION] command, and a <GATEWAY>[GATEWAY IN DOTTED DECIMAL NOTATION] command.

17. The particular device of interest as recited in claim 15, wherein the one or more programmed processors are incorporated in a root switch.

18. The particular device of interest as recited in claim 17, wherein the root switch is incorporated in a storage system.

19. The particular device of interest as recited in claim 18, wherein the storage system is incorporated in a storage area network (SAN).

20. A management interface for discovering devices of interest connected to an Ethernet via Ethernet ports, comprising:

means for broadcasting discovery protocol packets from a management interface to the devices of interest over the Ethernet via the Ethernet ports, the discovery protocol packets including an IP address of the management interface and a request for a MAC address from each of the devices of interest;

means for receiving a response broadcast from a particular device of interest, the response including a MAC address of the particular device of interest; and means for configuring the particular device of interest once the MAC address of the particular device of interest is known by a first means for broadcasting configuration protocol packets from the management interface to the devices of interest over the Ethernet via the Ethernet ports, the configuration protocol packets including the MAC address and new configuration information for the particular device of interest, a second means for determining the configuration protocol packets are intended for the particular device of interest based on the MAC address, and a third means for configuring the particular device of interest with the new configuration information, wherein, distinct from other devices connected to the Ethernet, the devices of interest do not contain RS-232 serial ports, and only the devices of interest are configured with modules capable of parsing appropriate data in the discovery protocol packets.

21. The management interface as recited in claim 20, further comprising means for utilizing a MAC address-command format for packets communicated from the management interface to the devices of interest, wherein the command is selected from the group consisting of a <GET_ALL> command, a <SET_IP>[IP ADDRESS IN DOTTED DECIMAL NOTATION] command, a <SET_NETMASK>[NETMASK IN DOTTED DECIMAL NOTATION] command, and a <SET_GATEWAY>[GATEWAY IN DOTTED DECIMAL NOTATION] command.

22. A particular device of interest for assisting in a discovery of devices of interest connected to an Ethernet via Ethernet ports, comprising:

means for receiving and parsing discovery protocol packets at the particular device of interest, the discovery protocol packets broadcast from a management interface to the particular device of interest over the Ethernet via the Ethernet ports and including an IP address of the management interface and a request for a MAC address from each of the devices of interest, and sending the MAC address from the particular device of interest back to the management interface via the Ethernet ports; and means for configuring the particular device of interest by a first means for receiving and parsing configuration protocol packets at the particular device of interest, the configuration protocol packets broadcast from the management interface to the devices of interest over the Ethernet via the Ethernet ports and including the MAC address and a new IP address for a device of interest, a second means for determining at the particular device of interest that the configuration protocol packets are intended for the particular device of interest based on the MAC address, and a third means for configuring the particular device of interest with the new IP address, wherein, distinct from other devices connected to the Ethernet, the devices of interest do not contain RS-232 serial ports, and only the devices of interest are configured with modules capable of parsing appropriate data in the discovery protocol packets.

23. The particular device of interest as recited in claim 22, further comprising means for utilizing a MAC address-command format for packets communicated from the devices of interest to the management interface, wherein the command is selected from the group consisting of a <IP>[IP ADDRESS IN DOTTED DECIMAL NOTATION] command, a <NETMASK>[NETMASK IN DOTTED DECIMAL NOTATION] command, and a <GATEWAY>[GATEWAY IN DOTTED DECIMAL NOTATION] command.

24. The particular device of interest as recited in claim 22, wherein the one or more programmed processors are incorporated in a root switch.

25. The particular device of interest as recited in claim 24, wherein the root switch is incorporated in a storage system.

26. The particular device of interest as recited in claim 25, wherein the storage system is incorporated in a storage area network (SAN).

* * * * *